United States Patent [19]

Crow, Jr.

[11] 4,280,563
[45] Jul. 28, 1981

[54] AUXILIARY SHOVELS FOR AGRICULTURAL IMPLEMENT

[76] Inventor: Arthur F. Crow, Jr., Milford, Ill.

[21] Appl. No.: 100,033

[22] Filed: Dec. 4, 1979

[51] Int. Cl.³ .......................................... A01B 25/00
[52] U.S. Cl. .................................. 172/126; 172/253; 172/491
[58] Field of Search ............... 172/126, 128, 132, 140, 172/201, 253, 491, 468, 471, 127, 130; 111/52, 33, 85

[56] References Cited

U.S. PATENT DOCUMENTS

| | | | |
|---|---|---|---|
| 3,158,204 | 11/1964 | Martin | 172/126 |
| 3,314,386 | 4/1967 | Kopaska | 111/52 |
| 3,528,507 | 9/1970 | Morkoski | 172/491 X |
| 4,048,929 | 9/1977 | Zumbahlen | 111/85 |

*Primary Examiner*—Richard J. Johnson

*Attorney, Agent, or Firm*—Peck & Peck

[57] ABSTRACT

An auxiliary shovel operatively mounted on each side of an agricultural implement, each being laterally disposed relative to the usual rows of shovels. A ground marker laterally extending from each side of the implement and being automatically operable into down ground engaging and marking position and into raised inoperative position. Each auxiliary shovel being connected with the marker which extends laterally from the same side of the implement, and means automatically connecting each shovel to a marker, each shovel being in down operative ground engaging and digging position when its corresponding marker is in down ground marking position and being in inoperative raised position when its corresponding marker is in raised position. The positions of the two laterally extending markers being controlled by the operator of the implement.

11 Claims, 4 Drawing Figures

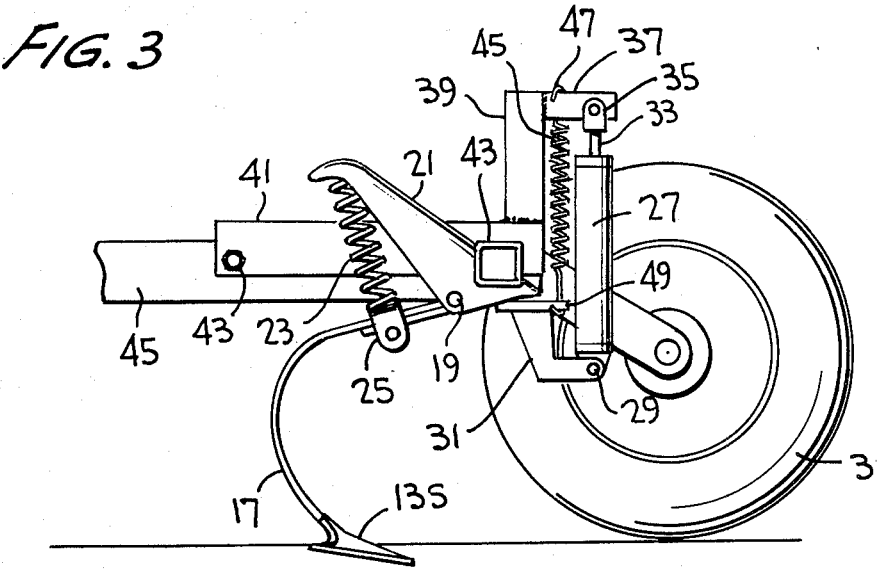
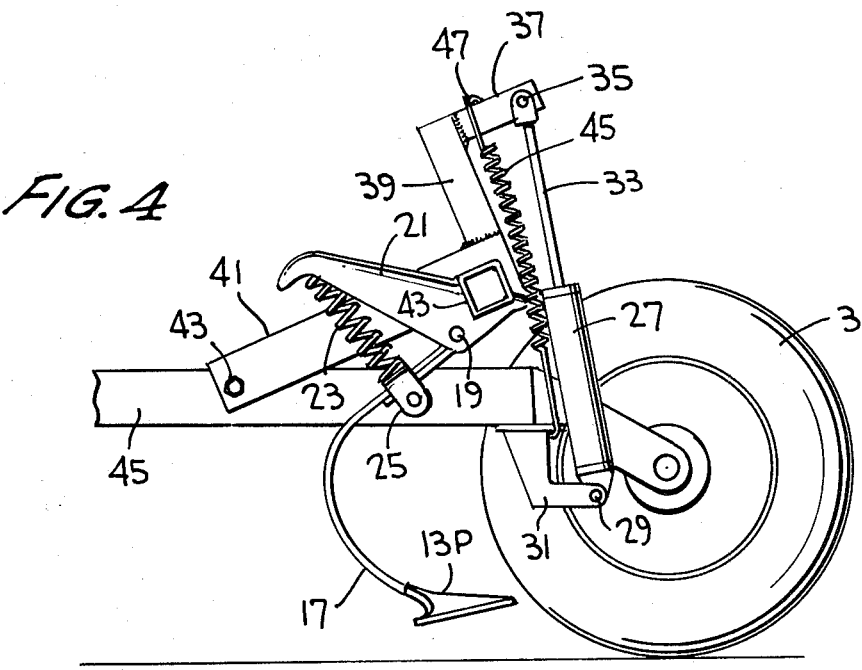

AUXILIARY SHOVELS FOR AGRICULTURAL IMPLEMENT

BRIEF SUMMARY OF THE INVENTION

It has been my experience in working intimately with large cultivator planter agricultural implements that it is difficult for the driver or operator of the implement to always drive on the proper course and when this occurs and the operator drives wide of the proper track the implement will miss a strip of soil which will not be dug up in the manner as desired. In order to overcome this difficulty an extra or auxiliary shovel is provided one of which is disposed at each side of the usual shovels or cultivators. The implement is provided with a pair of laterally extending marker arms, one being adapted to extend from one side of the implement and the other being adapted to extend from the other side of the implement. Each marker through operator controlled means, is operable into laterally extended position for making a visual mark on the soil, and also the marker by operator controlled means may be raised to inoperative position remote from its ground engaging position. When the marker on one side of the implement is in operative position the marker on the other side of the implement is in raised inoperative position. When the marker is in laterally extended ground engaging and marking position the shovel on that side of the implement is in down operative ground engaging and digging position, while the marker on the other side of the implement is in raised inoperative position the extra or auxiliary shovel on that side of the implement will be in raised inoperative position out of engagement with the soil. In other words, when one marker is in operative position the extra or auxiliary shovel on that side will be in operative position, and when the marker is in raised inoperative position the extra or auxiliary shovel on that side of the implement will be in inoperative position.

A hydraulic fluid flow line is connected to marker operating means on one side of the implement and also to the shovel on that side of the implement. A further hydraulic fluid line is connected to means on the other marker to control its position and also to means on the extra or auxiliary shovel on that side of the implement to control the position of such shovel. Each of these fluid flow lines is controlled by a hydraulic solenoid, the energization of which is controlled by the operator.

Additional objects and advantages of the present invention will become more readily apparent to those skilled in the art when the following general statements and descriptions are read in the light of the appended drawings.

BRIEF DESCRIPTION OF THE SEVERAL VIEWS OF THE DRAWINGS

FIG. 3 is an elevational view with parts thereof broken away and with the extra shovel in ground engaging digging position.

FIG. 4 is a view similar to FIG. 3 with the extra shovel in raised position removed from its operative ground engaging and digging position.

DETAILED DESCRIPTION

Figure 1:
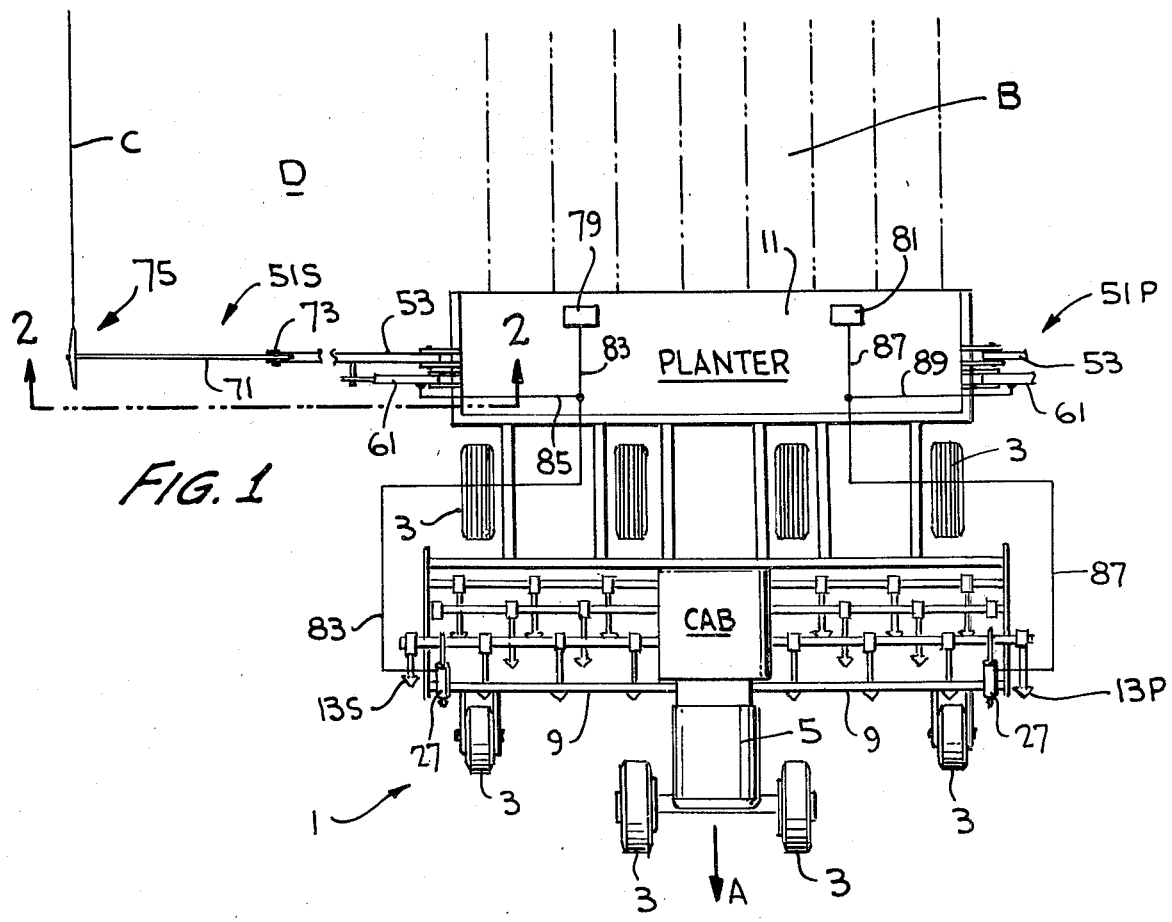
FIG. 1 is a plan view of an agricultural implement with a laterally extending marker arm in operative ground engaging position. There being a similar marking arm laterally extending from the other side of the implement.

The auxiliary shovel system is used with a cultivator planter agricultural implement which is designated generally by the numeral 1. The cultivator planter of this invention is a mobile implement which travels on a plurality of wheels 3, is driven by any suitable power means 5, and a cab 7 is provided in which the operator of the implement sits to control the movement of the implement and the other operating parts thereof, as will be explained. As is well known in the art the implement includes a plurality of cultivator shovels 9 which are preferably provided in transversely extending rows and are adapted to dig into and cultivate the soil in readiness for receiving the seed from the usual planter 11. In the operation of this implement it is often difficult for the operator thereof to drive the implement in the proper track and if it is driven wide a strip of soil will be missed and not dug up or cultivated and in order to avoid this occurrence I have added an auxiliary shovel on each side of the normal cultivator shovels. It is preferable to add this auxiliary shovel on each side of the first or front series of usual shovels. The auxiliary shovel on the left or port side of the implement is designated by the numeral 13P while the auxiliary shovel on the opposite or right starboard side is designated by the numeral 13S. The curved stem 17 for each auxiliary shovel is pivotally mounted as at 19 to a bracket 21. At its upper end the bracket supports a coiled compression spring 23 which is fastened to the stem 17 by means of any suitable clamping mechanism 25. A hydraulic cylinder 27 which is pivotally mounted as at 29 to a fixed bracket 31, the piston rod 33 of the hydraulic cylinder 27 is pivotally mounted at its upper end as at 35 to an arm 37. The arm 37 forwardly extends from and is fixed to the upper end of an upstanding member 39 which is fixed to a rocker arm 41 which is pivotally mounted as at 43 to an element 45 of the frame of the implement. A laterally extending arm 43 is fixed to and extends from the rocker arm 41, the laterally extending arm 43 also being fixed to the bracket 21. It will now be evident that when the rocker arm is rocked by means of extension and retraction of the piston rod 33 the members 37 and 39 will cause rocking motion of the rocker arm 41 as well as lifting or lowering the bracket 21 which is fixed to the stem 17 of the shovel so that the shovel will be raised from its engagement with the soil as is illustrated in FIG. 4 when the piston rod 33 is retracted. A coil spring 45 is anchored at one end as at 47 to the forwardly extending arm 37 and at its other end to the fixed bracket 31 as at 49. The coil spring side in the retraction of the piston rod 33 as is especially illustrated in FIG. 3 of the drawings. It is to be appreciated that in all instances when the piston rod 33 is retracted the auxiliary shovel 13S will be in engagement with the soil and when the piston rod 33 is extended as illustrated in FIG. 4 that auxiliary shovel 13P will be raised from engagement with the soil. It is to be recognized that the mounting and operating arrangement for each extra or auxiliary shovel is the same.

It should now be recognized that when hydraulic pressure is imparted to a piston in the cylinder 27 the piston rod 33 will be extended as illustrated in FIG. 4 of the drawings and the shovel 13P will be lifted from its digging engagement with the soil. When hydraulic pressure is released from the cylinder 27 the compression spring 23 will move the shovel 13S into digging engagement with the soil as illustrated in FIG. 3.

Figure 2:
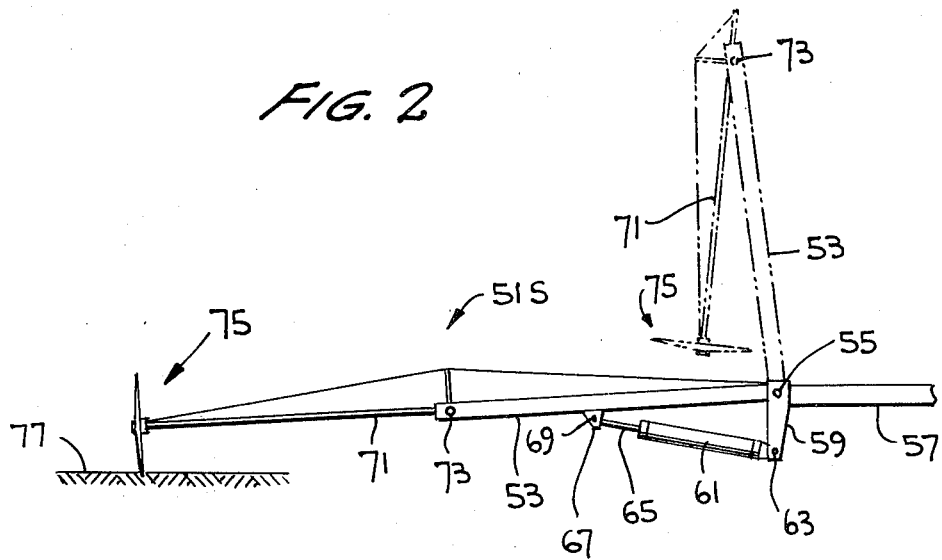
FIG. 2 is an elevational view of a marker arm in down operative position and also disclosed in phantom lines in raised inoperative position.

Laterally extending from each side of the implement 1 is a marker arrangement which, as will be explained in detail hereinafter, is in ground marking engagement when the marker is in operative down position. The marker which extends laterally from the starboard side of the planter has been indicated generally by the numeral 51S, while the marker extending laterally from the opposite or port side of the implement has been designated generally by the numeral 51P. Each marker includes an arm 53 which is pivotally mounted as at 55 to an element 57 of the frame. A downwardly depending bracket 59 is fixed to the frame 57. A hydraulic cylinder 61 is pivotally mounted as at 63 to the lower end of the bracket 59 and the piston rod 65 is operatively fixed at one end within the cylinder 61 to the usual piston which is operatively disposed therein, and at its other end the piston rod 65 is pivotally mounted as at 67 on a bracket 69 which is fixed to and extends from the arm 53. Extending from the arm 53 of the marker is an arm 71 which is pivotally mounted at its inner end 73 to the end of the arm 53 and the arm 71 carries any suitable soil or ground marking member 75 which when the marker is in down or operative position is in engagement with the soil 77 and leaves a mark thereon to guide the operator of the implement who is seated in element controlling position within the cab 7. In FIGS. 1 and 2 of the drawings the laterally extending marker 51S is illustrated in operative soil or ground marking position which for reasons of clarity may be described as its "down" position. When hydraulic pressure is imparted to the hydraulic cylinder 61 the piston rod 65 will be fully extended and the arm 53 will be raised on its pivot 55 into an upstanding position as illustrated in phantom lines in FIG. 2, while when the arm 53 is in such upright position the extending arm 71, due to gravity, will pivot downwardly as illustrated by the phantom lines in FIG. 2 and the entire marking mechanism will be in inoperative or up position and the auxiliary shovel 13P will be raised out of digging engagement with the soil as illustrated in FIG. 4. It is to be understood that the marker mechanism 51P which extends laterally from the opposite or port side of the implement involves the same components as those illustrated in FIG. 2, and is operated in the same manner. The means for operatively controlling the cylinders 27 and 61 will be described in detail hereinafter. When either marking mechanism is in operative down ground engaging position, as illustrated in FIG. 2, the corresponding shovel will be in down soil digging engagement as illustrated in FIG. 3.

The operation of the laterally extending markers 51 is controlled by the operator of the implement. Operator controlled switches are provided in the cab for operation by the operator of the implement to automatically move either marker 51S or 51P into up or down position. These switches are not specifically illustrated in the drawings since they are thought to be within the skill of anyone working in this art. One such switch is electrically connected to a solenoid 79 while the other switch within the cab is electrically connected to a solenoid 81, the solenoid 79 functioning to control the position of the marker 51S on the right or starboard side of the implement, while the solenoid 81 controls the position of the marker 51P on the opposite or port side of the implement. The solenoids are of the hydraulic type and a hydraulic line 83 connects the solenoid 79 to the hydraulic cylinder 27 which controls the position of the shovel 13S on that side of the implement. A further hydraulic line 85 is tapped into the main hydraulic line 83 and is connected to the hydraulic cylinder 61 on the starboard side of the implement. A main hydraulic line 87 is in communication with the solenoid 81 and extends to the hydraulic cylinder 27 on the opposite side of the implement. A hydraulic line 87 is in communication with the hydraulic solenoid 81 and extends therefrom to the hydraulic cylinder 27 on the port side of the implement. A hydraulic line 89 is tapped into the line 87 and extends to the hydraulic cylinder 61 on the port side of the implement. As will be understood this solenoid 81 controls the operation of the cylinder 27 for controlling the position of the shovel 13P and also controls the operation of the cylinder 61 for controlling and causing the marker mechanism 51P to assume up and down positions.

It will now be recognized that the hydraulic cylinders 79 and 81 control the flow of oil to the cylinders 61 on the markers 51S and 51P. When the solenoid 79 is energized hydraulic oil will flow to the cylinder 61 to thereby move the marker 51S into up position as illustrated in phantom lines in FIG. 2. The flow of oil to and from the cylinder 61 is through the lines 83 and 85. Simultaneously, the hydraulic fluid will flow to the cylinder 27 to thereby project the piston rod 33 to position as illustrated in FIG. 4 to thereby lift the shovel 13P from soil digging position. Similar actions will occur when the solenoid 81 is energized so that hydraulic fluid may flow through the lines 87 and 89 to the cylinder 61 on that side of the implement and to the cylinder 27.

In the plan view of the implement as illustrated in FIG. 1 of the drawings the implement is transversing the ground in the direction as indicated by the arrow A and in this sweep of the implement across the ground the soil behind the implement has been dug up and planted and this soil is designated by the letter B. The marker 51S has been put into down position by the operator of the implement who has operated the solenoid 79 so that the piston rod 65 of the cylinder 61 may be retracted so that the marking arm 51S will be in down position as illustrated in FIGS. 1 and 2. At the start of the operation the operator of the implement energizes the solenoid 81 so that the piston rod 65 of the piston 61 will be extended to lift the marker mechanism 51P into up position and simultaneously the piston rod 33 of the cylinder 27 will be extended to move the extra shovel 13P into up position as illustrated in FIG. 4. It will now be appreciated that the shovel 13S will be in down operative soil engaging and digging position when the marker 51S is in down position, while the extra or auxiliary shovel 13P will be in raised or up position when the marker mechanism 51P is in up position. In other words, when either marking mechanism is in up position the corresponding extra shovel will be in up position while if either marking mechanism is in down position its extra shovel will be in down operative position. It is also to be appreciated that if the marker mechanism 51S is in down position the marker mechanism 51P is in up position while if the marker mechanism 51P is in down position the marker mechanism 51S is in up position.

The ground marking means 75 which is provided on the end of each marker arm may be of any suitable type which will make a visual mark C in the soil as the implement runs in the direction A as shown in FIG. 1. This marker line C provides a guideline for the next sweep of the implement as it is turned around at the end of the field being dug and planted. When it is turned around to dig and plant the soil D adjacent to the worked soil B the operator of the implement will energize the solenoid 79 to move the marker mechanism 51S into up position and to also move the shovel 13S into raised inoperative position. When the implement is turned around to work the soil D the operator energizes the solenoid 81 to lower the marker mechanism 51P so that the ground marking means 75 on the end of the marker arm 51P is in ground engaging position to make a line similar to the line C to guide the operator of the implement in his next sweep. When the ground marking means 75 on the end of the marker arm 51P is in ground engaging position the extra shovel 13P will be in lowered operative ground digging position. It must be appreciated that the marker arm which extends from a side of the implement which is adjacent to the unworked soil D is the marker arm which is in operative down ground marking position.

When the implement is turned around at the end of the field and is traveling in the opposite direction from that shown by the arrow A in FIG. 1 and the marker arm 51S has been raised into inoperative position and the extra shovel 13S has been raised into inoperative position above the soil and the marker arm 51P has been lowered into operative ground marking position and the extra shovel 13P has been lowered into operative ground digging position, the operator of the implement will be guided by the line C in this sweep of the implement. In actual practice it has been found that it is often difficult for the operator of the implement to fully follow and drive on the marker track C at all times and if the implement is driven wide by the operator a strip of soil will be missed and the extra shovel, in this instance the down shovel 13P, will dig and take care of this missed strip.

What is claimed is:

1. An agricultural implement adapted to dig and cultivate the ground and plant seeds therein including, in combination, a mobile agricultural implement adapted to traverse the ground, said implement being provided with series of shovels for digging and cultivating the ground, an auxiliary shovel provided at each side of the implement and substantially in line with a series of shovels, each auxiliary shovel being operatively mounted on the implement and movable into down operative position engaging and digging the ground and to raised inoperative position removed from engagement with the ground, and a ground marker provided at each side of the implement, each of said ground markers being movably to and from operative ground engaging and marking position, means operatively connecting each auxiliary shovel to the ground marker which is on the same side of the implement and operable to move that auxiliary shovel into inoperative position when that ground marker is in inoperative position and to move that auxiliary shovel into operative ground engaging position when that ground marker is in operative ground engaging position, and the operation of said means being controlled by the operator of the implement.

2. An agricultural implement in accordance with claim 1, wherein each ground marker laterally extends from a side of the agricultural implement when the ground marker is in operative ground marking position and when one of said ground markers is in operative position the other of said ground markers is in inoperative position.

3. An agricultural implement in accordance with claim 2, wherein a ground marker, when in inoperative position, is in raised position extending above the body of the planter.

4. An agricultural implement in accordance with claim 3, wherein said means is operatively connected to each ground marker for moving a ground marker from operative to inoperative raised positions.

5. An agricultural implement in accordance with claim 3, wherein each ground marker comprises two arms pivoted together, said arms being in substantial alignment when said ground marker is laterally extended and in ground marking position and when said ground marker is in raised operative position one of said arms extends downwardly adjacent to but removed from the other of said arms.

6. An agricultural implement in accordance with claim 5, wherein said two arms comprise an outer arm and an inner arm, said arms being in substantial alignment when said ground marker is in laterally extending operative position, and said outer arm having ground marking means on the outer end thereof for marking engagement with the ground.

7. An agricultural implement in accordance with claim 6, wherein said outer arm is pivotally connected to the outer end of said inner arm and said outer arm pivoting on the outer end of said inner arm and extending downwardly when the ground marker is in inoperative raised position.

8. An agricultural implement in accordance with claim 7, wherein said means includes a piston having a piston rod, said piston rod being pivotally mounted to said inner arm and operative to move said inner arm to raised position, the said outer arm pivoting with respect to the inner arm when said inner arm is raised.

9. An agricultural implement in accordance with claim 1, wherein each of said auxiliary shovels is connected to and rockably mounted on the frame of said agricultural implement, said means being connected to an auxiliary shovel and operable to raise said auxiliary shovel into raised inoperative position removed from digging engagement with the ground, and mechanism for rocking the auxiliary shovel downwardly into ground engaging and digging position.

10. An agricultural implement in accordance with claim 9, wherein said means is operatively connected to a ground marker and to the auxiliary shovel on the same side of the implement and is operable to raise an auxiliary shovel into inoperative position when its respective ground marker is in raised inoperative position and is moved to operative position in digging engagement with the ground when its respective ground marker is in operative position.

11. An agricultural implement in accordance with claim 9, wherein a frame mounted rocker arm is provided and the auxiliary shovel is connected thereto for movement therewith, and said means for causing movement of the auxiliary shovel to and from operative and inoperative positions comprises a piston including a piston rod extensible therefrom, one end of said piston rod being connected to said rocker arm for causing rocking thereof.

* * * * *